United States Patent
Nicol

[15] 3,653,694
[45] Apr. 4, 1972

[54] TUBE COUPLING ASSEMBLY

[72] Inventor: John Nicol, Palos Verdes Peninsula, Calif.

[73] Assignee: Teledyne, Inc., Los Angeles, Calif.

[22] Filed: June 24, 1970

[21] Appl. No.: 49,452

[52] U.S. Cl. .......................................... 285/334.4, 285/374
[51] Int. Cl. ....................................................... F16l 19/00
[58] Field of Search ............... 285/334.4, 363, 374, 399, 403, 285/332.1; 287/109

[56] References Cited

UNITED STATES PATENTS

| | | | |
|---|---|---|---|
| 3,439,941 | 4/1969 | Nicol | 285/334.4 X |
| 2,258,066 | 10/1941 | Oyen | 285/334.4 X |
| 1,846,096 | 2/1932 | Feldmeier | 285/334.4 X |
| 3,501,178 | 3/1970 | Watts | 287/109 X |
| 2,283,254 | 5/1942 | Heeter | 287/109 R |
| 2,737,403 | 3/1956 | Ellis | 285/334.4 X |
| 2,127,611 | 8/1938 | Mueller | 285/334.4 X |
| 2,641,489 | 6/1953 | Hedburg | 285/334.4 X |

*Primary Examiner*—David J. Williamowsky
*Assistant Examiner*—Wayne L. Shedd
*Attorney*—Ronald W. Reagin, Stephen L. King and Kenneth W. Mateer

[57] ABSTRACT

A tube coupling assembly is disclosed which includes a tubular male coupling member having a sealing lip and including a nose at the end of the sealing lip, an outer sealing surface and an inner concave surface. A female coupling member is provided which includes an inner inwardly tapering seating surface adapted to receive the sealing surface of the male member and which also includes a shoulder portion extending inwardly from the tapered seating surface. The male member is placed in the female member and secured thereto by a conventional nut and thread arrangement. The nut is tightened until an adequate seal is obtained between the sealing surface of the male member and the seating surface of the female member, in a conventional manner. However, if the nut is over-torqued, thereby attempting to force the male member to penetrate too far into the female member, the nose of the sealing lip bottoms against the shoulder member, and the combination of the resultant forces and the concave surface create a moment in the sealing lip which attempts to cause it to buckle outwardly, thereby increasing the seal between the mating surfaces of the male and female members.

7 Claims, 5 Drawing Figures

PATENTED APR 4 1972　3,653,694
SHEET 1 OF 2
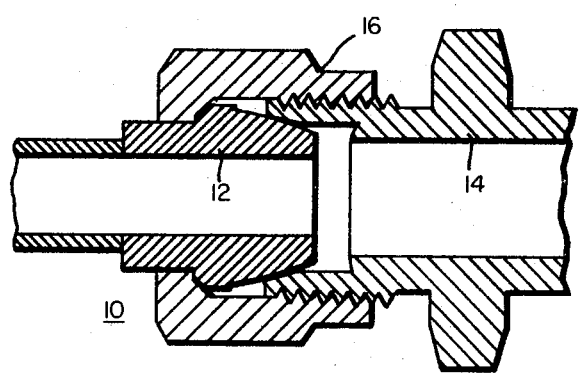
Fig. 1
PRIOR ART
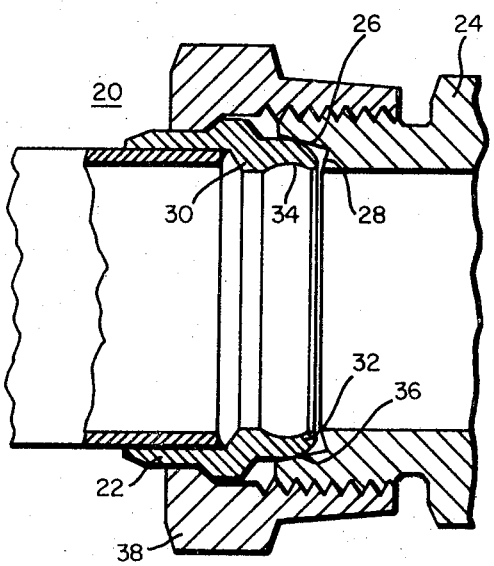
Fig. 2
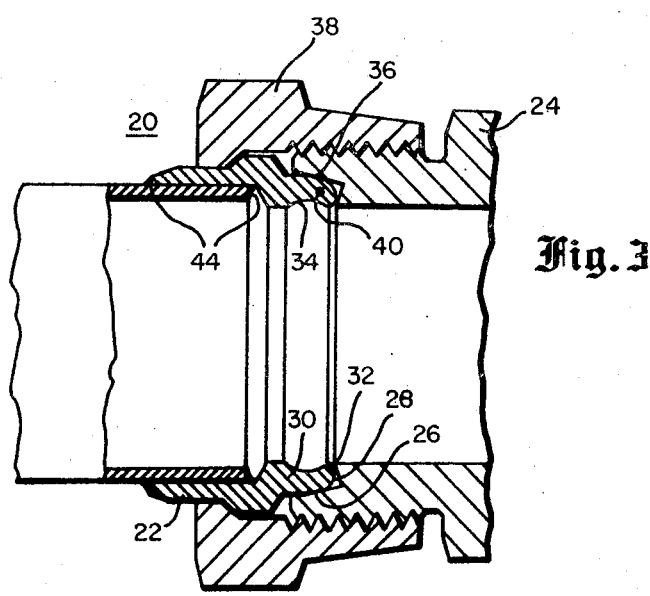
Fig. 3
JOHN NICOL
INVENTOR.
BY 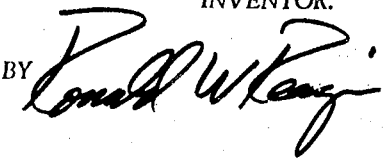
ATTORNEY.

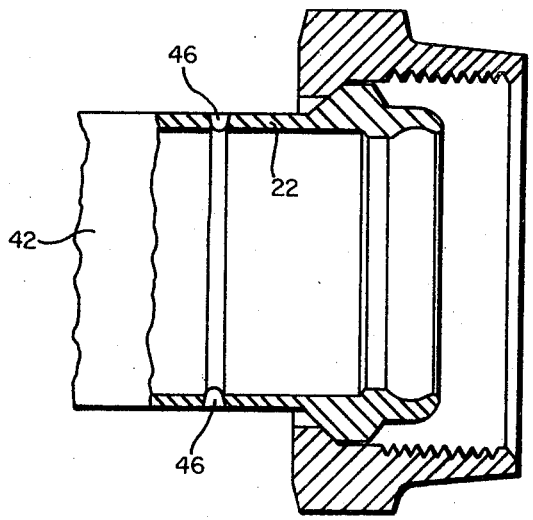
Fig. 4
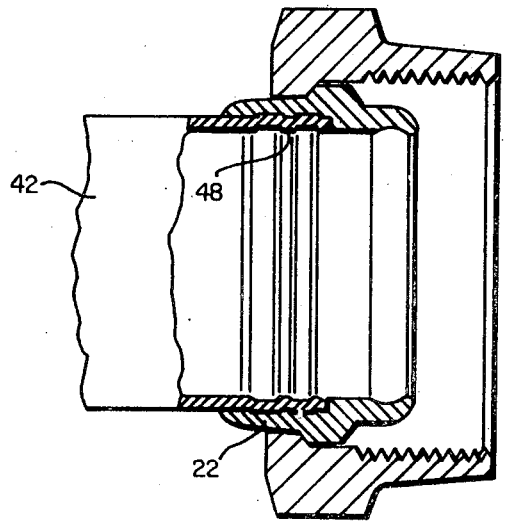
Fig. 5
JOHN NICOL
INVENTOR.
ATTORNEY.

TUBE COUPLING ASSEMBLY

BACKGROUND OF THE INVENTION

This invention relates to tube coupling assemblies and more particularly to an improved flareless tube coupling assembly in which over tightening of the assembly creates an improved seal rather than a leak.

There is a class of tube coupling assemblies in the prior art which includes a female member having an inwardly tapering seating surface and a male sleeve member which penetrates into the female member and whose outer surface seals against the tapered surface of the female member. The assembly is usually held together by a nut which is retained on the male member by a shoulder around its outer surface and which is attached to the female member by threads around the outer surface of the female member. This type of fitting is sometimes known as an ermeto fitting.

This type of fitting has proven to be quite useful and is in widespread use today. The fitting is especially used in connection of hydraulic pressure lines. However, when so used, a serious problem has developed with these fittings. They are frequently assembled in the field by mechanics who have no way to measure accurately the torque being applied to the nut, and if the nut is over-torqued, this results in leaks from the fitting rather than from a tighter seal. The reason for these leaks is because of the tapered surface of the female member. When the nut is over-torqued, thereby attempting to cause the male member to penetrate further into the female member, the tapered surface results in inwardly directed forces upon the outer surfaces of the male sleeve, and the male sleeve frequently buckles inwardly, thereby creating leaks between the outer surface of the male sleeve member and the inner surface of the female member.

OBJECTS OF THE INVENTION

It is accordingly an object of the present invention to provide an improved tube coupling assembly.

It is another object of the present invention to provide an improved flareless tube coupling assembly in which over-torquing of the nut results in an improved seal.

It is yet another object of the present invention to provide an improved flareless tube assembly in which over-torquing of the nut results in forces which cause the male sleeve member to attempt to buckle outwardly, thereby increasing the seal of the coupling.

BRIEF DESCRIPTION OF THE INVENTION

Briefly stated, and in accordance with the presently preferred embodiment of the invention, a tube coupling assembly is provided which includes a male sleeve member having a sealing lip which includes a nose at the end thereof, an outer sealing surface and an inner concave surface. A female member is provided which has an inner inwardly tapering seating surface and an inwardly extending shoulder position. The male member is coupled to the female member in a normal sealing position in which the outer sealing surface of the male member contacts and seats against the inner seating surface of the female member. In this normal sealing position the nose of the male member is just in front of the shoulder of the female member. If the assembly is over tightened and the male member attempts to penetrate further into the female member, the nose of the male member contacts the shoulder of the female member and the resultant force, in combination with the concave inner surface of the male member, results in a moment in the sealing lip which tends to cause the sealing lip to buckle outwardly, thereby increasing the seal of the assembly. Also, at the same time, the assembler will notice an abrupt increase in the torque necessary to tighten the assembly and he will know that the assembly should not be further tightened.

BRIEF DESCRIPTION OF THE DRAWINGS

For a complete understanding of the invention together with an appreciation of the other objects and advantages thereof, please refer to the attached drawings and the detailed description thereof, in which:

FIG. 1 is a cross sectional view of a flareless tube coupling assembly in accordance with the prior art and illustrates the disadvantages thereof;

FIG. 2 is a cross sectional view of a flareless tube coupling assembly in accordance with the present invention, and shows the assembly in its normal sealing position;

FIG. 3 is a cross sectional view of the flareless tube coupling assembly of FIG. 2, and shows the assembly and an over tightened position;

FIG. 4 illustrates a second manner of attaching the male sleeve member of the assembly of FIGS. 2 and 3 to a tube; and FIG. 5 illustrates yet another way of attaching the male sleeve member to a tube.

DETAILED DESCRIPTION OF THE DRAWINGS

FIG. 1 shows a cross sectional view of a flareless tube coupling assembly in accordance with the prior art. As shown therein, the assembly 10 includes a male sleeve member 12 and female member 14. The inner surface of female member 14 is tapered inwardly, and this inwardly tapering seating surface receives the outer sealing surface of male member 12. The male member 12 is held in contact with and sealed against the inner surface of female member 14 by a nut 16, which is retained on member 12 by a shoulder around its outer edge and which is attached to member 14 by threads around its outer surface. The members 12 and 14 are then attached to the sections of tubing to be joined in any convenient manner.

One of the problems with the coupling assembly 10 shown in FIG. 1 is that if nut 16 is tightened too far down, the inner tapered surface of female member 14 exerts a radial force inwardly upon the outer surface of male member 12 and member 12 may buckle inwardly, thereby creating leaks in the coupling assembly. This problem can be particularly severe in field conditions when a mechanic is tightening the assembly by hand with a wrench and has no accurate way of knowing when the proper torque on the nut has been achieved. There is no particular warning to the assembler when the excess torque has been applied, and frequently it is not even known until the system is activated and the assembly leaks.

FIG. 2 shows a cross sectional of a flareless tube coupling assembly in accordance with the present invention which overcomes the above mentioned disadvantage in the prior art. As shown therein, the coupling assembly 20 again includes a male sleeve member 22 and a female member 24. Again, female member 24 includes an inwardly tapering inner seating surface 26. However, female member 24 also includes a shoulder portion 28 whose function is described later.

Male sleeve member 22 includes a sealing lip section 30 which penetrates female member 24. The sealing lip 30 includes a nose portion 32 at its end and has a concave or undercut section 34 on the inner surface of sealing lip 30 and a somewhat rounded or convex surface 36 on the outer surface of sealing lip 30. Again, a nut 38 is held on male sleeve member 22 by a suitable shoulder and this nut 38 attaches to corresponding threads on the outer surface of female member 24 to seal the two members together. The members could also be held together by any other suitable arrangement, such as flanges bolted together.

FIG. 2 shows the nut 38 tightened a proper amount so that male sleeve member 22 is in its normal sealing position with respect to female member 24. At this point, the outer sealing surface 36 of sealing lip 30 is in contact with and seals against the inner inwardly tapering seating surface 26 of female member 24. The seal is thus effected in the same manner as in the prior art device of FIG. 1.

However, in the event nut 38 is over tightened, the assembly 20 overcomes the above described disadvantages of the prior art. FIG. 3 shows a cross sectional view of the tube coupling assembly 20 when the nut 38 has been over tightened and male sleeve member 22 has penetrated into female member 24 to a greater extent than in the normal sealing position shown in FIG. 2. As shown therein, if nut 38 is over tightened, sealing lip 30 penetrates slightly further into the opening of female member 24 until the nose 32 thereof bottoms against shoulder 28 of female member 24. This causes two beneficial results. First, the assembler will feel an abrupt increase in the amount of torque necessary to further tighten nut 38, and will know that he should not further tighten the nut. Also, in the event the assembler does continue tightening the nut, despite the increase torque required to do so, an axially directed force will appear against the end of nose 32 from shoulder 28. This force will be substantially greater than the increasing radial inwardly directed force being exerted on surface 36 of sealing lip 30 by surface 26 of female member 24. The resultant of these forces will be a definite moment around point 40 in a clockwise direction and this moment, especially in combination with the undercut or concave surface 34, tends to buckle the sealing lip 30 outwardly. Of course, there is no actual substantial outward buckling movement by sealing lip 30, but this force presses the outer sealing surface 36 of male sleeve member 22 tighter against the inner seating surface 26 of female member 24, and results in a tighter seal when the nut is over-torqued, rather than in a leak as in the case of the prior art.

Male sleeve member 22 and female member 24 may be attached to the tubing to be connected in any convenient manner. For example, FIG. 3 shows male sleeve member 22 attached to a tube 42 at brazes 44. FIG. 4 shows male sleeve member 22 attached to tube 42 at a weld 46. FIG. 5 shows male sleeve member 22 attached to tube 42 at a swag 48.

Another inherent advantage of the assembly 20 over the prior art assembly 10 of FIG. 1 is that, since the danger of leaking if the assembly is over tightened has been eliminated, the length of the portion of male sleeve member 22 which penetrates into female member 24 can be reduced. This reduction in penetration depth makes assembly of the coupling much easier, especially if fairly rigid tubing is being used, and greatly reduces the danger that the tubing will be kinked and thus possibly punctured during the assembly operation.

While the invention has thus been disclosed and the presently preferred embodiment described in detail, the invention is not limited to the specific shown embodiment. Instead, many modifications will occur to those skilled in the art which lie within the spirit and scope of the invention. Accordingly, it is not intended that the invention be limited in scope to the shown embodiment, but instead that the invention be limited in scope only by the appended claims.

What is claimed is:

1. A tube coupling assembly comprising, in combination:
   a. a male member having a sealing lip including an inwardly curved nose at the end thereof, a convex outer sealing surface and an inner concave surface,
   b. a female member having an inner inwardly tapering seating surface,
   c. means for coupling said male member into said female member in a normal sealing position in which said outer sealing surface contacts and seals against said seating surface, and
   d. means for causing said sealing lip to attempt to buckle outwardly if said male member penetrates into said female member beyond said normal sealing position, thereby increasing the seal between said outer sealing surface and said seating surface.

2. The combination of claim 1 in which said means for causing said sealing lip to attempt to buckle outwardly comprises a nose engaging shoulder extending inwardly from said seating surface and positioned in said female member beyond the penetration depth of said nose when said male member is in said normal sealing position, whereby when said male member is forced beyond said normal sealing position said nose bottoms against said shoulder, and whereby attempted further forcing of said male member creates a moment in said sealing lip which causes said sealing lip to attempt to buckle outwardly.

3. The combination of claim 2 in which said means for coupling said male member to said female member comprises a nut secured around said male member and mating threads around the outer surface of said female member.

4. The combination of claim 4 which further includes means for securing said male member to a tube to be coupled to said female member.

5. The combination of claim 4 in which said male member is welded to said tube.

6. The combination of claim 4 in which said male member is brazed to said tube.

7. The combination of claim 4 in which said male member is swaged to said tube.

* * * * *